United States Patent [19]
Kim et al.

[11] Patent Number: 5,815,308
[45] Date of Patent: Sep. 29, 1998

[54] BIDIRECTIONAL OPTICAL AMPLIFIER

[75] Inventors: Hyung B. Kim, Kanata; Farideh Khaleghi, Ottawa; Jinghui Li, Nepean; Mohsen Kavehrad, Cumberland, all of Canada

[73] Assignee: Northern Telecom Limited, Montreal, Canada

[21] Appl. No.: 650,536

[22] Filed: May 20, 1996

[51] Int. Cl.[6] ............................. H01J 5/16; H04B 9/00; H01S 3/103
[52] U.S. Cl. .......................... 359/341; 359/174; 359/334
[58] Field of Search .................... 359/124, 134, 359/174, 334, 337, 341

[56] References Cited

U.S. PATENT DOCUMENTS

| | | |
|---|---|---|
| 5,128,800 | 7/1992 | Zirngibl . |
| 5,280,549 | 1/1994 | Barnard et al. . |
| 5,430,572 | 7/1995 | DiGiovanni et al. . |
| 5,440,417 | 8/1995 | Chung et al. . |
| 5,452,124 | 9/1995 | Baker . |
| 5,532,864 | 7/1996 | Alexander et al. ............ 359/341 |
| 5,600,473 | 2/1997 | Huber ........................ 359/179 |

FOREIGN PATENT DOCUMENTS 535590   4/1993   European Pat. Off. .

OTHER PUBLICATIONS

J.L. Gimlett et al., Observation of Equivalent Rayleigh Scattering Mirrors in Lightwave Systems with Optical Amplifiers, Mar. 1990, 211–213, IEEE PTL, vol. 2, No. 3.

J.L. Gimlett and N.K. Cheung, Effects of Phase–to–Intensity Noise Conversion by Multiple Reflection on Gigabit–per–Second DFB Laser Transmission Systems, Jun. 1989, 888–895,
IEEE JLT, vol. 7, No. 6.

M. Oskar van Deventer, Unipaired Trsmission Thriugh a Bidirectional Embrium–Doped Fiber Amplifier Near Lasing Threshold, Sep. 1995, 1078–1080, IEEE PTl, vol. 7, No. 9.

C.W. Barnard, J. Chrostawski and M. Kavehrad, Bidirectional Fiber Amplification, Aug. 1992, 911–913, IEEE PTL, vol. 4 No. 8.

Y.H. Cheng et al., 622 Mb/s, 144 km Transmission Using a Bidirectional Fiber Amplifier Repeater, Mar. 1993, 356–358. IEEE PTL, vol. 5, No. 3.

J. Haugen, J. Freeman and J. Conradi, Full–duplex bidirectional transmission at 622 Mbit/s with two embrium–doped fiber amplifier, 1993,42–42, OFC/IOOC, Paper Tu16

S. Seika, K. Kusunoki and S. Shimikado, 2.4–Gbit/s–signal bidirectional WDM amplification by an $Er^{3+}$—doped fiber amplifier, Feb. 1993, 39–40, OFC/IOOC.

Khaleghi et al, IEEE Photonics Tech. Lett., vol. 8, No. 9, pp. 1252–1254, Sep. 1996.

*Primary Examiner*—Nelson Moskowitz

[57] ABSTRACT

Bidirectional WDM transmission at 2.5 Gb/s using a bidirectional erbium-doped fiber amplifier (EDFA) is demonstrated over a distance of 300 km. A symmetrical EDFA configuration with a frequency tunable reflection attenuator is used as a bidirectional amplifier. Experimental results show that the allowable gain of the EDFA can be increased significantly while the associated bit error rate BER penalty remains negligible.

10 Claims, 7 Drawing Sheets

PBS : POLARIZATION BEAM SPLITTER
NRR : NON-RECIPOCAL ROTATOR
RR : RECIPOCAL ROTATOR
BPF : BAND PASS FILTER

BIDIRECTIONAL OPTICAL AMPLIFIER

FIELD OF THE INVENTION

This invention relates to a bidirectional optical amplifier particularly but not exclusively involving the use of erbium-doped fiber amplifiers (EDFA's).

BACKGROUND OF THE INVENTION

Erbium-doped fiber amplifiers have succeeded in a wide-range of applications as postamplifiers, preamplifiers, and in-line repeaters in optical fiber communications systems. However, the great majority of these systems are configured for transmission in a single direction only and use unidirectional EDFA's with optical isolators on both the input and output. The bidirectional operation of an EDFA is desired since it has the advantage of reducing not only the number of fiber links by a factor of two but also the number of passive components such as splitters in bidirectional multi-channel passive optical networks, e.g., fiber-to-the-home/curb/business systems. Bidirectional amplification allows the bidirectional transmission of tree distributed networks by compensating for the splitting losses.

As is known, an EDFA is at lasing threshold when the round-trip gain equals one, i.e., $G_{max}^2 R_1 R_2 = 1$, where $R_1$ and $R_2$ are reflections on respective sides of the EDFA and $G_{max}$ is the gain peak of the amplifier. However, the maximum amplifier gain is restricted to much smaller values before the system degradation becomes unacceptable.

For bidirectional transmission systems with optical amplifiers, severe system degradations are due to multiple reflections which interferometrically convert laser phase noise into intensity noise. The presence of reflections due to Rayleigh backscattering (reflection power typically is of the order of −31 to −34 dB for a long length of fiber) limits the maximum tolerable gain to about G=19 dB if no optical isolator is incorporated in the amplifiers as is demonstrated by J. L. Gimlett et al. in "Observation of Equivalent Rayleigh Scattering Mirrors in Lightwave Systems with Optical Amplifiers", IEEE Photonics Technology Letters, Vol. 2, No. 3, pp 211–213, March 1990. The interferometric noise from multiple reflections increases proportionally with amplifier gain, i.e., a factor of 20 dB gain requires a reduction in reflectance by the same 20 dB over the previously tolerable reflectance.

FIG. 1 depicts a transmission link with an erbium-doped fiber amplifier and a reflection on each side of the EDFA. The interference between transmitted and doubly reflected optical fields introduces the interferometric noise. For Gbit/s transmissions with an erbium-doped fiber and two reflections using single-frequency lasers, for which the data rate is much higher than the continuous wave (CW) laser linewidth $\Delta V$ ($\Delta V$ typically≈10–100 MHz), most of this noise falls within the receiver bandwidth. Typically, the length of the erbium-doped fiber (EDF) exceeds the coherence length of DFB lasers. Therefore, the two optical fields interfere incoherently, and the variance of the reflection-induced intensity noise can be easily calculated according to J. L. Gimlett and N. K. Cheung, "Effects of Phase-to-Intensity Noise Conversion by Multiple Reflections on Gigabit-per-Second DFB Laser Transmission Systems," IEEE Journal of Lightwave Technology, Vol. 7, No. 6, pp 888–895, June 1989 by means of the equation $$\delta^2 = \alpha^2 G^4 R^2 (P/h\nu B)^2 \quad (1)$$

where $\alpha$ is the attenuation between the amplifier and the receiver, G is the amplifier gain, $R^2 = R_1 R_2$ for maximally aligned states of polarization, P is the peak input power into the amplifier, B is the bit-rate and $(P/h\nu B)$ is the number of photons per bit. This noise and signal-spontaneous emission beat noise which is the dominant amplifier-related noise together introduce a power penalty for high-bit rate systems. Approximating the intensity noise as being Gaussian-distributed, the power penalty for an OOK modulated signal can be computed according to Gimlett and Cheung by means of the equation $$\text{penalty } (\lambda) = -5 \log[1 - 144(N_{sp} h\nu B / P_{in}(\lambda) + G^2 R^2)] \quad (2)$$

where $P_{in}(\lambda)$ is the time-average input power of the amplifier at wavelength $\lambda$, and $N_{sp}$ is the amplifier noise factor ($N_{sp}=1$ for an ideal amplifier). For a given value of $P_{in}(\lambda)$ GR must be limited to a certain value to maintain a tolerable power penalty.

Among bidirectional EDFA configurations that have been proposed is one disclosed in an article by C. Barnard et al, "Bidirectional Fiber Amplifiers", IEEE Photonics Technology Letters, Vol. 4, No. 8, pp 911–913, August 1992 and in a related U.S. Pat. No. 5,280,549 issued Jan. 18, 1994 to Barnard et al. This EDFA configuration uses an optical amplifier in each of two parallel branches such that reflected light from one side is amplified by one of the branches and reflected light from the other side is amplified by the other branch resulting in noisy multiple reflections.

A similar arrangement using circulators is proposed in an article by Y. H. Cheng et al., "622 Mb/s, 144 Km Transmission Using a Bidirectional Fiber Amplifier Repeater," IEEE Photonics Technology Letters, Vol. 5, No. 3, pp 356–358, March 1993 and that too suffers degradation from multiple reflections.

SUMMARY OF THE INVENTION

It is an object of the present invention to provide a bidirectional optical amplifier in which the problems associated with reflections are obviated or mitigated.

According to a broad aspect, the present invention provides a bidirectional optical amplifier device comprising a first input/output port and a second input/output port, a first optical amplifier coupled to the first input/output port, a second optical amplifier coupled to the second input/output port and a bidirectional frequency tunable reflection attenuator (FTRA) coupled between the first and second optical amplifiers, the FTRA allowing optical signals within a first predetermined frequency band to pass from the first optical amplifier to the second optical amplifier and substantially preventing optical signals within a second predetermined frequency band from passing from the first optical amplifier to the second optical amplifier and allowing optical signals within the second predetermined frequency to pass from the second optical amplifier to the first optical amplifier and substantially preventing optical signals within the first predetermined frequency from passing from the second optical amplifier to the first optical amplifier.

In a preferred arrangement, each optical amplifier is an erbium doped fiber coupled through a wavelength division multiplexing (WDM) coupler to a laser pump.

BRIEF DESCRIPTION OF THE DRAWINGS

Embodiments of the invention will now be described by way of example, with reference to the accompanying drawings, in which.

DESCRIPTION OF THE PREFERRED EMBODIMENTS

Figure 2:
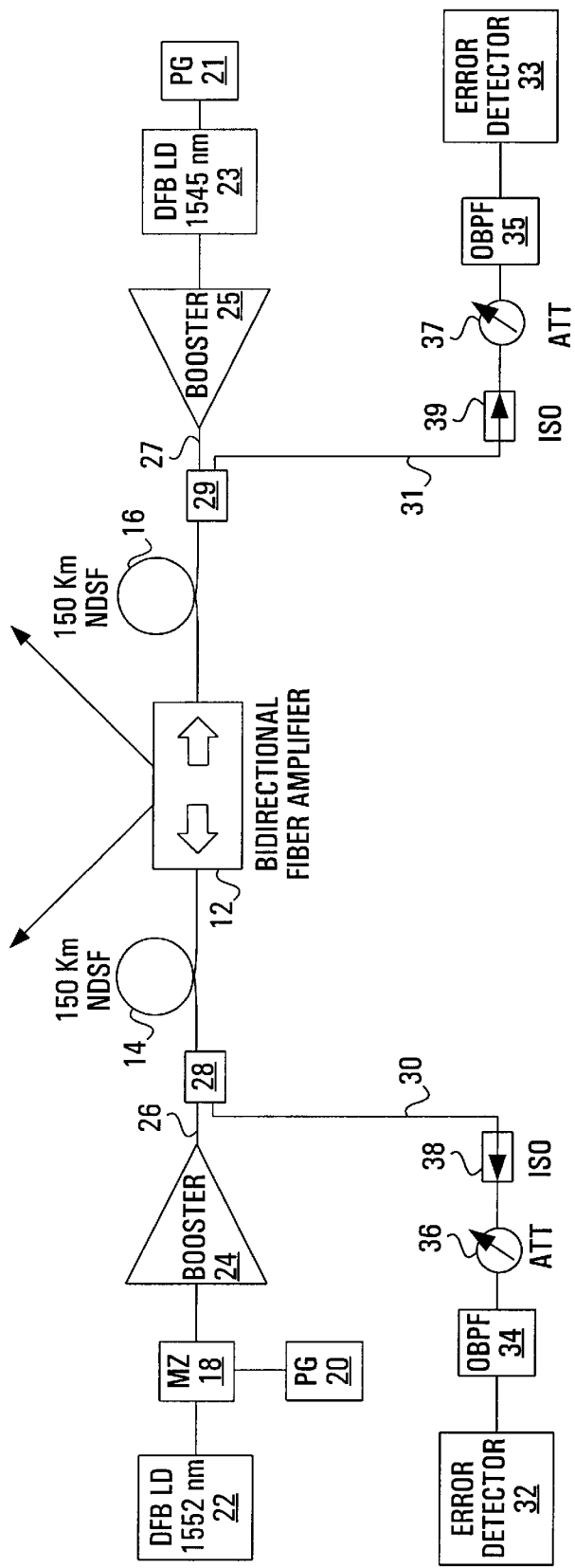
FIG. 2 is a schematic diagram of an experimental transmission system including a bidirectional EDFA.

An experimental bidirectional optical transmission system 10, as illustrated in FIG. 2, is based on a configuration comprising a bidirectional fiber amplifier 12 coupled to first and second lengths 14 and 16 of a non-dispersion shifted fiber (NDSF), each fiber 14 and 16 being 150 km long.

At one end of the fiber transmission path, a Mach-Zehnder (MZ)-modulator 18, driven by a pattern generator PG 20 is connected to modulate a distributed feedback (DFB) laser diode 22, which emits at 1552 ND and a booster 24, feeds an optical signal into a first input 26 of an input coupler 28. At the other end of the fiber transmission path, a pattern generator 21 is connected to an internally modulated DFB laser diode 23 which emits at 1545 nm and a booster 25 feeds an optical signal into a first input 27 of an input coupler 29. Coupled to a second input 30, 31 of each input coupler 28, 29 is an error detector 32, 33, an optical band pass filter (OBPF) 34, 35, an attenuator 36, 37, and an optical isolator 38, 39.

Figure 3:
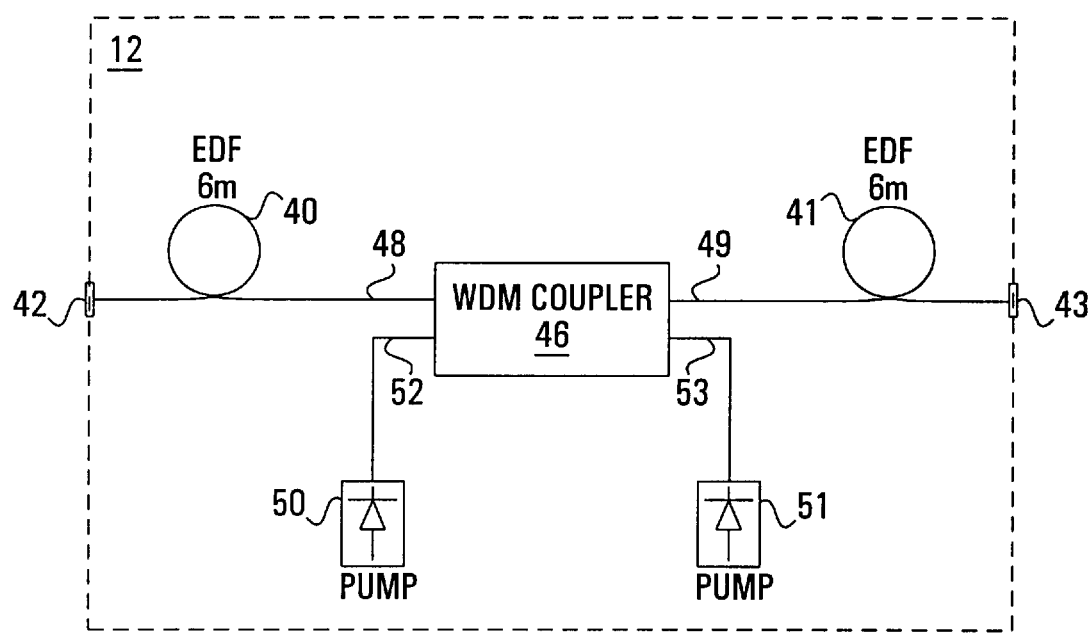
FIG. 3 is a schematic diagram of a bidirectional EDFA module which is not provided with any isolators.
Figure 4:
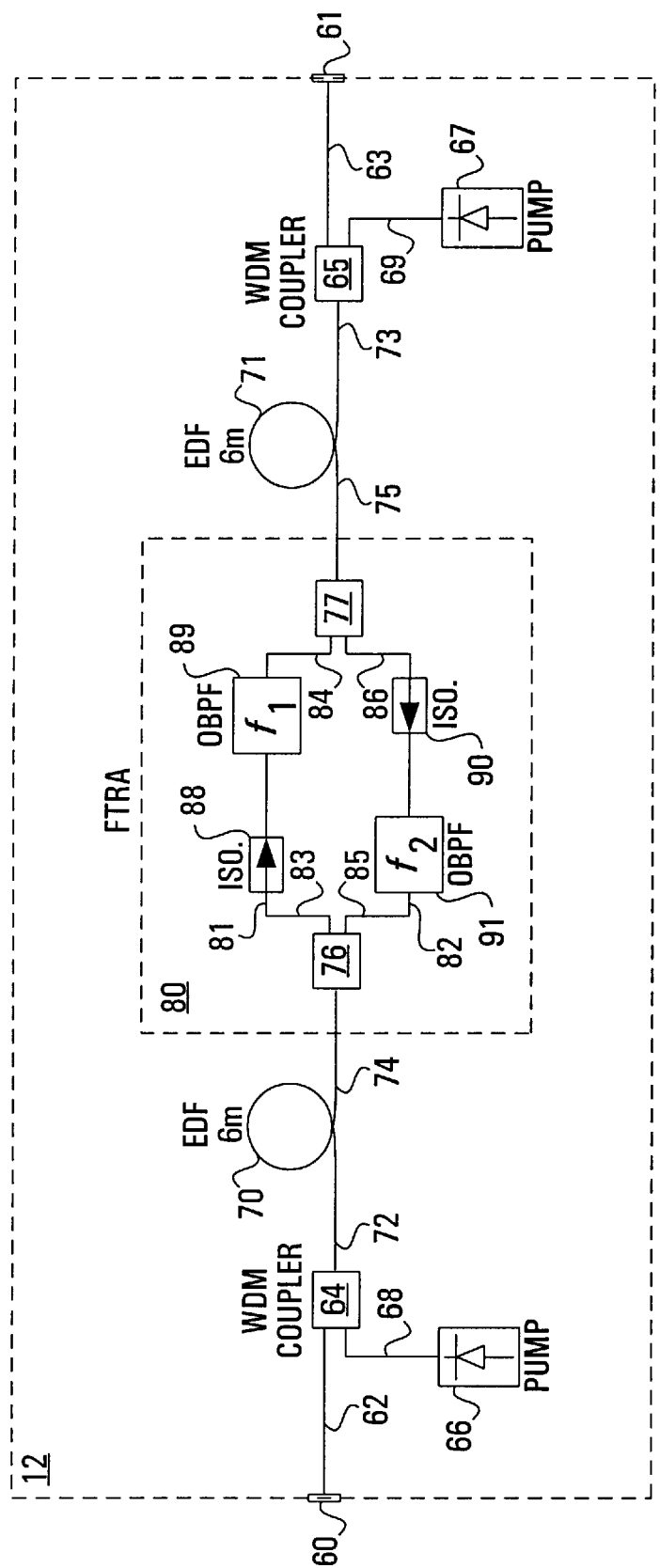
FIG. 4 is a schematic diagram of an EDFA module according to an embodiment of the present invention.

For comparison purposes a bidirectional fiber amplifier of the type shown in FIG. 3 was used as amplifier 12 in FIG. 2 and the transmission system 10 tested and then a bidirectional fiber amplifier of the type shown in FIG. 4 was used as amplifier 12 in FIG. 2 and the transmission system tested again.

The bidirectional fiber amplifier 12 shown in FIG. 3 comprises first and second lengths 40, 41 of erbium doped fiber coupled to input/output ports 42, 43 of the amplifier and coupled through first and second ports 48, 49 of a wavelength division multiplexing (WDM) coupler 46. First and second laser pump sources 50, 51 are coupled directly to third 52 and fourth ports 53 of the WDM coupler 46. This configuration for a bidirectional fiber amplifier was found to suffer from high bit error rates from both multiple reflections and noise generated from double Rayleigh backscattering.

In a bidirectional fiber amplifier according to a first embodiment of the present invention, as shown in FIG. 4, the bidirectional fiber amplifier 12 comprises first and second input/output ports 60, 61 coupled to first ports 62, 63 of first and second WDM couplers 64, 65. Pump lasers 66 and 67 are coupled to second ports 68, 69 of the first and second WDM couplers 64, 65. Erbium-doped fibers 70, 71 are coupled between third ports 72, 73 of WDM coupler 64, 65 and first ports 74, 75 of third and fourth directional couplers 76, 77. The first ports 74, 75 can be considered input/output ports of a frequency tunable reflection attenuator (FTRA) 80 which comprises first and second parallel branches 81, 82. First branch 81 is connected between a second port 83 of coupler 76 and a second port 84 of coupler 77 and second branch 82 is connected between a third port 85 of coupler 76 and a third port 86 of coupler 77. Branch 81 comprises an isolator 88 serially connected to an optical band pass filter (OBPF) 89 tuned to pass optical signals within a first predetermined frequency band $f_1$ and branch 82 comprises an isolator 90 serially connected to an OBPF 91 tuned to pass optical signals within a second predetermined frequency band $f_2$. The isolators are connected to pass light in mutually opposite directions.

Figure 9:
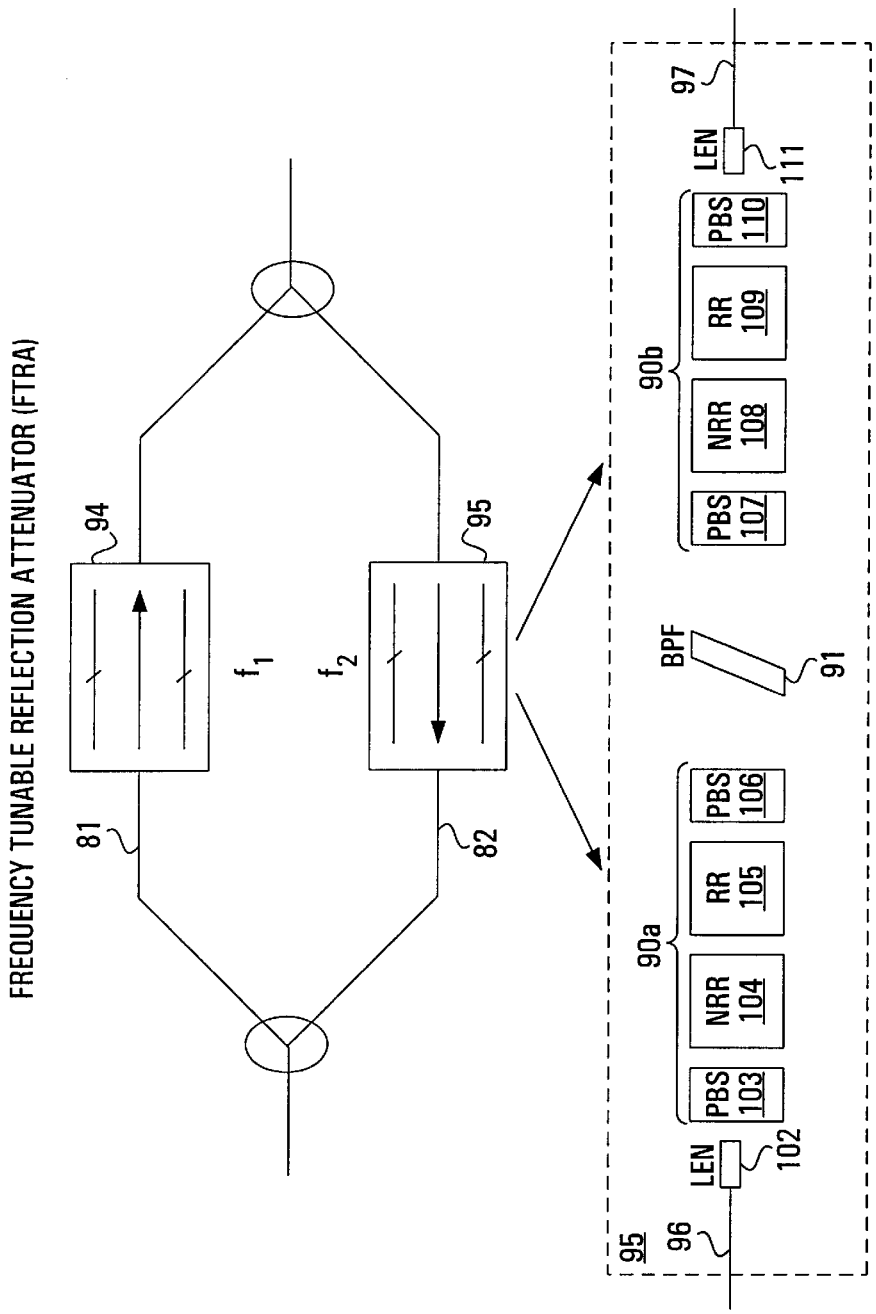
FIG. 9 is a schematic diagram of an FTRA generally of the type illustrated in FIG. 4 but illustrating in greater detail the optical elements used.

Although FIG. 4 illustrates a single isolator in each branch 81 and 82, in practice two isolators were actually used in each branch, one on each side of the OBPF 89 and OBPF 91, to provide improved isolation. FIG. 9 illustrates an example of such an arrangement in which the two isolators and the OBPF are formed as a single package of optical elements which package provides bandpass filtering as well as isolation. Thus, each branch 81 and 82 contains respectively an optical package 94 and 95.

Optical package 95 is connected between a left fiber portion 96 and a right fiber portion 97 and comprises from left to right a lens 102 connected to fiber portion 96 and a first optical isolator 90a comprising a first polarization beam splitter (PBS) 103, a non-reciprocal rotator (NRR) 104, a reciprocal rotator (RR) 105, a second polarization beam splitter (PBS) 106 followed by a bandpass filter (BPF) 91. On the right hand side of BPF 91 is a second optical isolator 90b comprising from left to right a first PBS 107, an NRR 108, an RR 109 and a second PBS 110. A second lens 111 is connected to a right hand fiber portion 97.

The isolators 90a and 90b of package 94 are constructed and configured in conventional manner to pass optical signals from right to left and to substantially prevent optical signals from passing from left to right. The arrangement of optical elements forming optical package 94 is not illustrated but it could be formed of elements which are identical to those used in optical package 95 except that the order is reversed. Thus, PBS 110 would appear at the extreme left hand side and PBS 103 would be located at the extreme right hand side. The filter 91 could be either tunable or fixed.

Both in the reference arrangement shown in FIG. 3 and the arrangement constructed according to the invention and illustrated in FIG. 4 the lasers used in the experimental set up were 980 nm for forward and counter-propagation pump, the EDF lengths were 6 meters long and the material of the EDF was erbium/aluminum co-doped, with Er concentration of 2000 ppm-wt, 2.4 micro core size, numerical aperture 0.24 and cut off wavelength of 960 nm. The coupler 46 was a 980/1550 nm WDM coupler. Couplers 64 and 65 were 980/1550 nm WDM couplers and couplers 76 and 77 were simple 3 dB couplers.

In operation, the system of FIG. 2 was operated at 2.488 Gbit/s using a $2^7-1$ pseudorandom signal using the bidirectional amplifier of FIG. 3 and again using the bidirectional amplifier of FIG. 4 according to the invention. The MZ-modulator 18 intensity modulated the output of laser diode 22 at 1552 nm. The booster 24 increased the optical power from MZ-modulator 18 to +6 dBm and could provide a signal as high as 14 dBm. The optical signal at 1552 nm which is within the first predetermined frequency band $f_1$ was transmitted through the 150 km length of fiber 14, with an attenuation of 0.22 dB/km and amplified in the bidirectional fiber amplifier 12 and then transmitted over the 150 km length of fiber 16 and the received optical power was adjusted in attenuator 37. The bit error rate (BER) was detected in detector 33.

At the same time the laser diode 23 was transmitting a signal in the opposite direction at 1545 nm which is within the second predetermined frequency band $f_2$. The laser diode 23 was internally modulated by a 622 Mb/s signal instead of using an external modulator but one could have been used. The BER was detected in detector 32.

Figure 1:
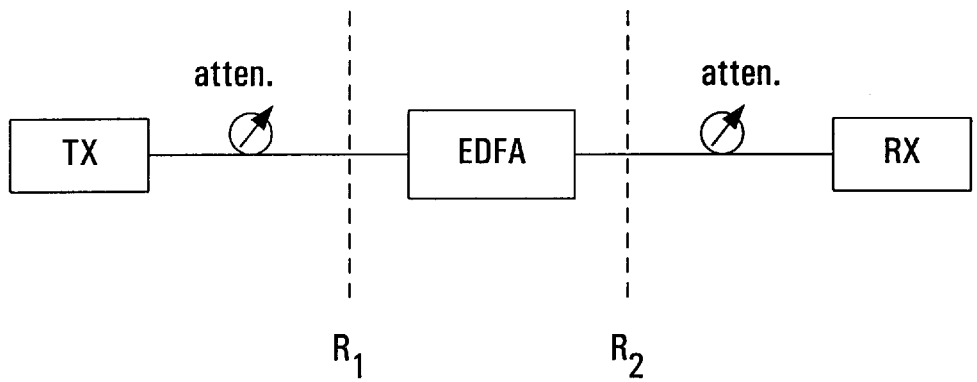
FIG. 1 is a schematic diagram of a transmission system to explain the effect of reflections.
Figure 5:
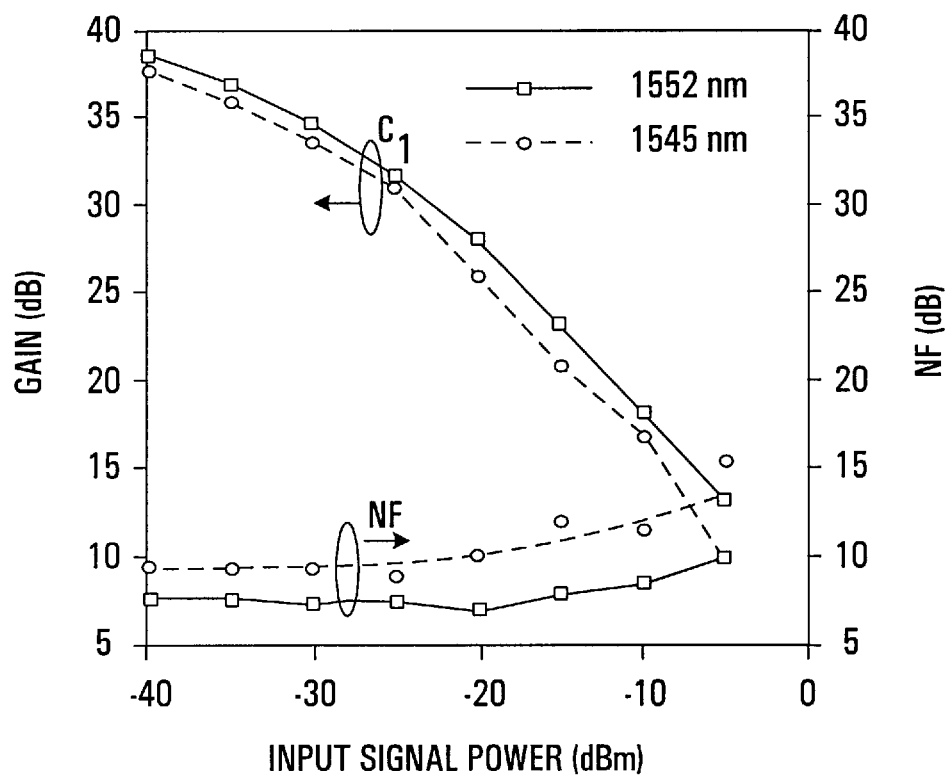
FIG. 5 is a graph showing bidirectional optical amplifier gain and noise figures versus input signal power.

The gain and noise figure achieved when the bidirectional amplifier 12 was constructed according to FIG. 3 are shown in FIG. 5. The gain and noise figures are plotted against input signal power, where equal signals in both directions are present. An optical gain of 36 dB was obtained for an input power of −30 dBm in both directions with pump powers of 40 and 45 mw, respectively.

Figure 6:
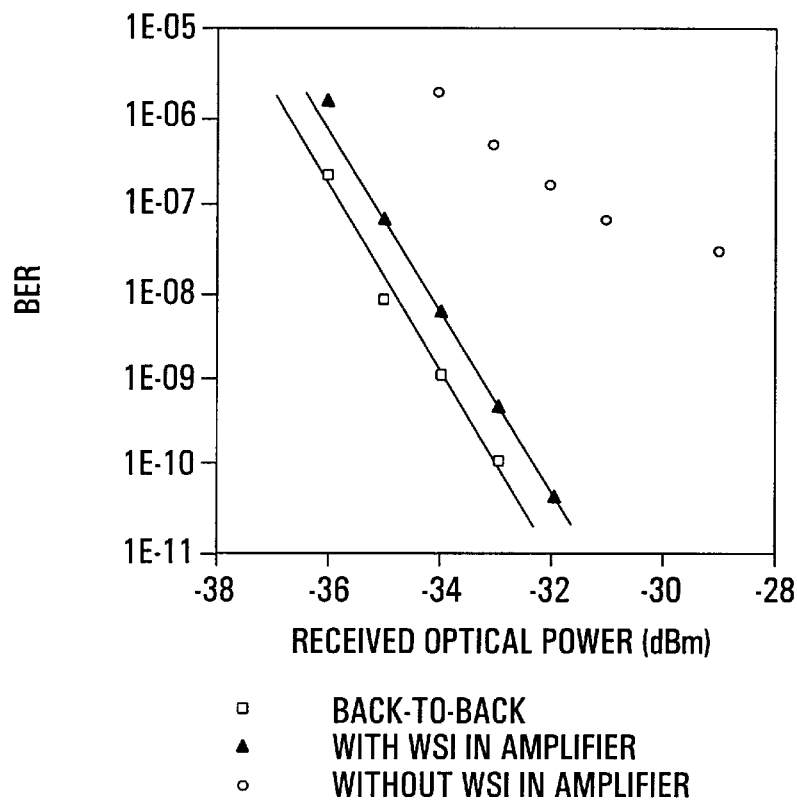
FIG. 6 is a graph showing measured bit error rate versus received optical power.

The BER against the power received by an APD receiver was measured both for the case incorporating the FIG. 3 bidirectional amplifier and the case incorporating the FIG. 4 bidirectional amplifier and the results are shown in FIG. 6. In the case where the amplifier includes a FTRA (FIG. 4 embodiment) there is only a 0.5 dB penalty at BER of $10^{-9}$. However, in the case where there is no isolator in the amplifier (FIG. 3 circuit) there is a BER floor at $5\times10^{-7}$. In this case, the amplifier gain is 18 dB for an input signal power of −15 dBm.

Figure 7:
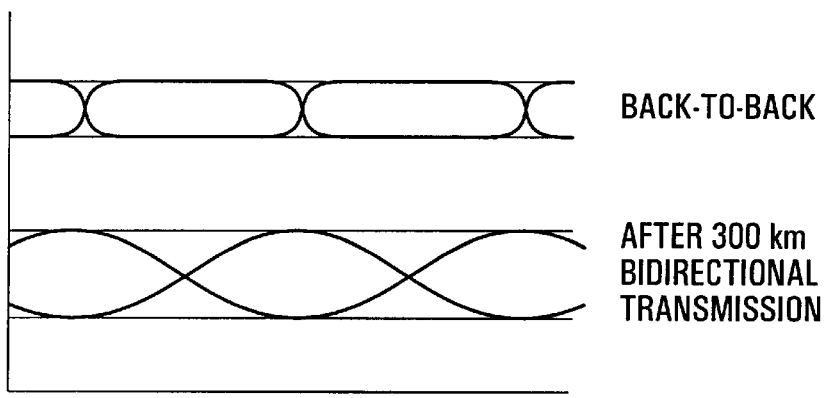
FIG. 7 is an eye diagram showing the waveforms obtained for back-to-back and after 300 km transmission using the EDFA module of the invention.

It can be seen from FIG. 6 that the BER graph for the FIG. 4 embodiment is quite similar to the BER graph for a so-called back-to-back transmission, i.e., without the 300 km of optical fiber separating the transmitter and receiver and also without the amplifier 12, which is used as a reference. This close similarity and, therefore lack of signal degradation, is observable in the eye diagram of FIG. 7.

It is noted that the gain of 36 dB achieved over 300 km of fiber at 2.48 GB/s transmission rate is a significant improvement over prior bidirectional systems. For example, in cases where optical isolators have not been used the maximum allowable gain has been demonstrated to be 19 dB over a very short fiber length and a low modulation rate of 155 mB/s. Cheung et al (see above) reported that in their device using two isolators and two circulators the maximum gain was 14 dB over a length of 144 km at 622 Mb/s.

It is noted that the bidirectional amplifier of FIG. 4 consists of two EDFA's (64, 66, 70 and 65, 67, 71) between which is inserted the FTRA 80. The passband of the EDFA's is almost 30 nm and this configuration allows bidirectional signals transmitted on a single optical fiber to be amplified by both EDFAs while they are isolated from propagating in the other direction. Each signal is amplified by a co- and then a counter-propagating EDFA. Signals having a frequency within the first frequency band $f_1$ after being amplified by a pump co-propagating EDFA, propagate through the FTRA 80 in one direction and are prevented from propagating in the reverse direction. These signals are once again amplified by a counter-propagating EDFA. Signals having a frequency within the second frequency band $f_2$ are treated in the same way. The transmission wavelengths can be tuned by adjusting optical filters.

This configuration increases the maximum allowable amplifier gain for certain penalty tolerance In two ways:

1) Since the reflected signals are blocked in between the two amplifier stages by the FTRA, the maximum gain limit can be calculated for each stage, separately. The value of the reflection R is reduced by decreasing either $R_1$ or $R_2$ of each amplifier according to the relative position of each amplifier and the FTRA. Thus, the amplifier unit can provide a large gain while the gain of each amplifier stage is less than the entire gain in order to guarantee a certain power penalty.

2) A major part of the amplified spontaneous emission (ASE) noise generated in each amplifier stage is prevented from entering the other EDFA stage because of the filtering properties of the FTRA. This prevents saturation of the second amplifier by ASE. Therefore, the maximum achievable gain can be increased.

An amplifier gain of 36 dB is achieved for an input signal of −30 dBm power in both directions. The gains of the first and the second amplifier stages for 1552 nm signal were 26 and 21 dB, respectively. The 1545 nm signal is amplified by almost the same order of gain at each amplifier stage in the opposite direction. An 11 dB loss is associated with the FTRA between the two stages of EDFAs.

The reflected light from each stage will be split into two parts where the first part will be blocked by the isolator with an isolation level of 45 dB. The second part is attenuated by the optical filter. The FWHM filter bandwidth is 1.64 nm. With this filter 7 nm away from the passband center, the rejection level if 34.8 dB. Therefore, the reflected signals are effectively attenuated by an extra 35 dB compared to the transmitted signals. Hence, the maximum allowable gain can be increased by 35 dB.

Experimental results have confirmed there is a great penalty and BER floor when the EDFA without isolators (FIG. 3) is used as a repeater. The gain of the EDFA is only around 18 dB in this case. However, the gain of fiber amplifier with a FTRA (FIG. 4) can reach 36 dB with an input signal of −30 dBm power, while the power penalty at BER of $10^{-9}$ is only around 0.5 dB.

Figure 8:
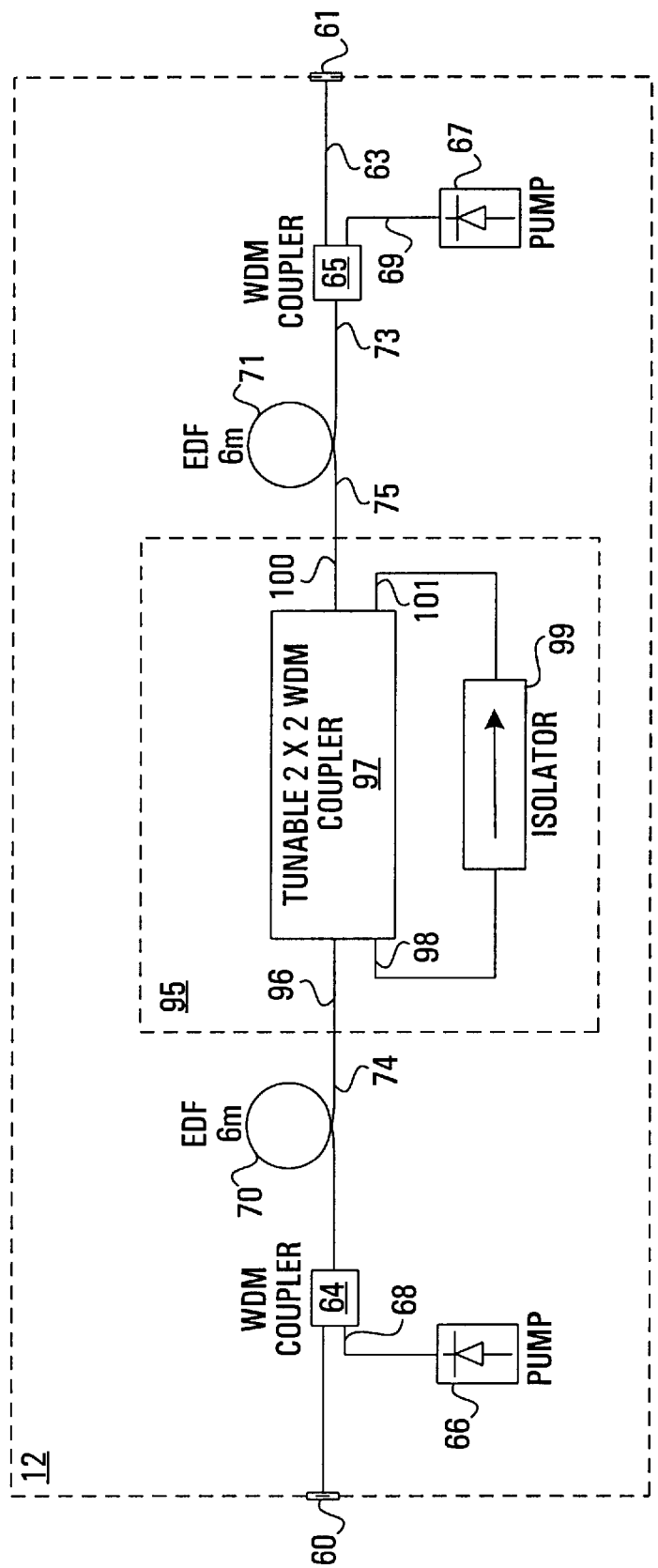
FIG. 8 is a schematic diagram of an EDFA module according to a second embodiment of the invention.

Referring now to FIG. 8, which shows a second embodiment of the invention, the basic circuit arrangement is similar to that illustrated in FIG. 4 except that the FTRA 95 has a different configuration from FTRA 80 of FIG. 4. As before, the FTRA has an input/output port 74 and an input/output port 75. The input/output port 74 is connected to a first port 96 of a tunable 2×2 WDM coupler 97. A second port 98 of coupler 97 is connected to an isolator 99. The input/output port 75 is connected to a third port 100 of coupler 97. The coupler has a fourth port 101 which is coupled to the other end of the isolator 99.

In operation, coupler 97 reflects from port 96 to 98 and from port 101 to port 100 optical signals in the first frequency band $f_1$. It also cross-passes from port 100 to port 98 and from port 101 to port 96 optical signals in the second frequency band $f_2$. Thus, only optical signals within frequency band $f_1$ are allowed to pass from input/output port 74 to input/output port 75 and only optical signals within frequency band $f_2$ are allowed to pass in the opposite direction.

While the invention has been described using an erbium-doped fiber, it is known in the art to use other rare earth-doped fibers as optical amplifiers and the invention is in no way limited to the use of erbium-doped fibers. Indeed, the use of optical amplifiers other than rare earth doped fiber amplifiers is considered to fall within the ambit of the invention. For example, such optical amplifiers could comprise semiconductor optical fibers, fiber Raman amplifiers or fiber Brillouin amplifiers.

We claim:

1. A bidirectional optical amplifier device comprising a first input/output port and a second input/output port, a first optical amplifier coupled to the first input/output port, a second optical amplifier coupled to the second input/output port and a bidirectional frequency tunable reflection attenuator (FTRA) coupled between the first and second optical amplifiers, the FTRA allowing optical signals within a first predetermined frequency band to pass from the first optical amplifier to the second optical amplifier and substantially preventing optical signals within a second predetermined frequency band from passing from the first optical amplifier to the second optical amplifier and allowing optical signals within the second predetermined frequency band to pass from the second optical amplifier to the first optical amplifier and substantially preventing optical signals within the first predetermined frequency band from passing from the second optical amplifier to the first optical amplifier.

2. A bidirectional optical amplifier according to claim 1 wherein the FTRA comprises first and second parallel branches each connected at a first end through a first directional coupler to the first optical amplifier and each connected at a second end through a second directional coupler to the second optical amplifier, the first branch having a first optical filter connected in series with a first optical isolator and the second branch having a second optical filter connected in series with a second optical isolator.

3. A bidirectional optical amplifier according to claim 1 wherein the FTRA comprises first and second parallel branches each connected at a first end through a first directional coupler to the first optical amplifier and each connected at a second end through a second directional coupler to the second optical amplifier, the first branch having a first optical filter located between and connected in series with two optical isolators and the second branch having a second optical filter located between and connected in series with another two optical isolators.

4. A bidirectional optical amplifier according to claim 3 wherein each optical isolator comprises a serially connected arrangement of a first polarization beam splitter followed by a non-reciprocal rotator, a reciprocal rotator and a second polarization beam splitter.

5. A bidirectional optical amplifier according to claim 1 wherein the FTRA comprises a 2×2 tunable wavelength division multiplexing (WDM) coupler having first, second, third and fourth ports, the first port being connected to the first optical amplifier, the third port being connected to the second optical amplifier and the second and fourth ports being mutually connected through an isolator, the coupler being arranged to reflect optical signals within the first predetermined frequency band from the first port to the second port and from the fourth port to the third port and the coupler also being arranged to cross-pass optical signals within the second predetermined frequency band from the third port to the second port and from the fourth port to the first port.

6. A bidirectional optical coupler according to claim 1 wherein each optical amplifier is an erbium-doped fiber coupled through a wavelength division multiplexing (WDM) coupler to laser pump means.

7. A bidirectional optical coupler according to claim 2 wherein each optical amplifier is an erbium-doped fiber coupled through a wavelength division multiplexing (WDM) coupler to laser pump means.

8. A bidirectional optical coupler according to claim 3 wherein each optical amplifier is an erbium-doped fiber coupled through a wavelength division multiplexing (WDM) coupler to laser pump means.

9. A bidirectional optical coupler according to claim 4 wherein each optical amplifier is an erbium-doped fiber coupled through a wavelength division multiplexing (WDM) coupler to laser pump means.

10. A bidirectional optical coupler according to claim 5 wherein each optical amplifier is an erbium-doped fiber coupled through a wavelength division multiplexing (WDM) coupler to laser pump means.

* * * * *